W. MEZEI & F. PODMANICKY.
EGG BREAKER.
APPLICATION FILED DEC. 18, 1913.
1,102,780.
Patented July 7, 1914.
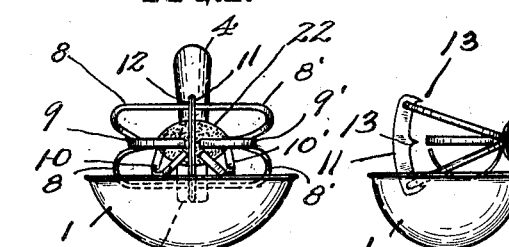
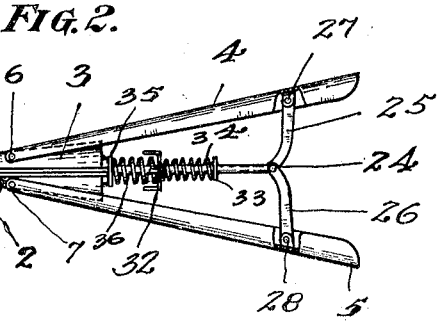
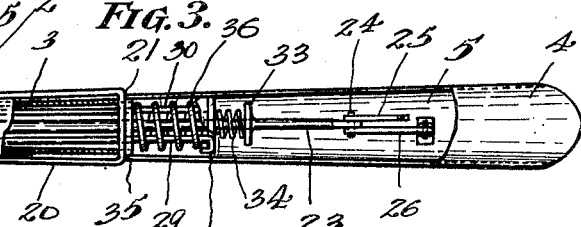
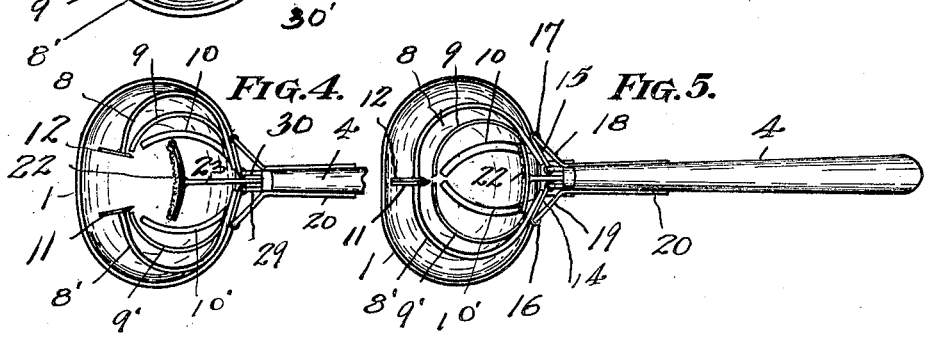
WITNESSES
WILLIAM MEZEI.
FRANK PODMANICKY.
INVENTORS.
ATTORNEY.

UNITED STATES PATENT OFFICE.

WILLIAM MEZEI AND FRANK PODMANICKY, OF EAST PITTSBURGH, PENNSYLVANIA.

EGG-BREAKER.

1,102,780.

Specification of Letters Patent.

Patented July 7, 1914.

Application filed December 18, 1913. Serial No. 807,473.

*To all whom it may concern:*

Be it known that we, WILLIAM MEZEI, a subject of the King of Hungary, and FRANK PODMANICKY, a citizen of the United States, both residing at East Pittsburgh, in the county of Allegheny and State of Pennsylvania, have invented certain new and useful Improvements in Egg-Breakers, of which the following is a specification.

The present invention relates to improvements in egg breakers, and is designed particularly for the purpose of providing a kitchen utensil or implement that is inexpensive in cost of production, simple in operation, durable, and efficient in performing the functions for which it is intended.

The primary object of the invention is the provision of a device by means of which the shells of eggs may be broken preparatory to the use of the egg for culinary purposes. By means of our invention it is possible to determine the condition of the egg after breaking the shell, but before the egg is deposited in the frying pan or other cooking utensil, in order to avoid the unintentional use of a bad egg.

Our invention further provides means by which the meat of the egg may be extracted from the shell without separation of parts of the egg, and means by which the handling of the egg meat may be facilitated, while at the same time the broken or separated shell may be disposed of by proper manipulation of the device.

The invention consists in certain novel combinations and arrangements of parts wherein the egg shell is clamped and broken by which the meat of the egg is withdrawn from the shell to a receptacle, and from the receptacle may be deposited in a utensil as desired.

In the accompanying drawings we have illustrated one complete example of the physical embodiment of our invention constructed according to the best mode we have so far devised for the practical application of the principles of our invention.

Figure 1 is a front end view of the implement embodying our invention. Fig. 2 is a side elevation of the implement of Fig. 1, parts in normal position. Fig. 3 is an enlarged plan view of the device, partly broken away, showing the parts in the first operative position in which an egg is clamped or held and ready to have its shell broken or pulled apart. Fig. 4 is a fragmentary plan view showing the parts in the position assumed after the egg shell has been torn apart and the meat of the egg allowed to drop into the cup or receptacle for the egg. Fig. 5 is a top plan view of Fig. 2.

In the preferred embodiment of our invention the device is constructed of suitable metal and is fashioned with a cup or receptacle 1 of hemi-spherical shape which is attached by a bracket arm 2 to a tapered or conical tube 3, so that these three elements are rigid with each other. A pair of hand pieces 4 and 5 are pivoted respectively at 6 and 7 to the tapered tube 3 by means of pins which pass transversely through the upper and lower parts of the tube and through suitable ears formed for the purpose at the ends of the hand pieces or handles 4 and 5.

The handles 4 and 5 form the actuating means by which the egg shell is clamped, held, and broken. The egg to be operated upon is held in an openable basket comprising the duplicate curved arms 8, 9, 10 and 8', 9', 10' located just over the cup 1 and it will be noted that the arms 8 and 8' are used in pairs with curved plates 11 and 12 connecting the pairs. These curved plates are each formed with a suitable number of sharp prongs 13, three being illustrated on each plate which are adapted to pierce an egg shell, and when properly actuated perform the function of tearing the egg shell apart. The arms of the basket are all attached, in series, to a pair of links 14, 15, and these links are pivoted respectively at points 16 and 17 to the ends 18 and 19 of a yoke 20, and the yoke is in turn rigidly fixed to the tapering tube 3 and the rear bar 21 of the yoke is perforated and extends across the rear open end of the tube.

The egg and its shell are held in the basket by means of a cushioned head 22 carried on the end of a push bar 23 which extends from the cup 1 over which the head 22 is located, through the tube 3, horizontally to the rear between the two handles 4 and 5, and the end of the bar is pivoted at 24 to a pair of independent lever arms 25 and 26 which are pivoted respectively at 27 and 28 to the handles 4 and 5, by means of perforated lugs or ears. By means of this connection between the push bar, the lever arms and the handles, it will be seen that by compressing the handles or squeezing them together in a hand grasp, the push bar and its cushioned head 22 are projected from the normal position of Fig. 5 to the position shown in Fig. 3, where it is assumed an egg is held by its shell between the head 22 and the prongs 13. While held in the condition or position indicated in Fig. 3, a continuation of the squeezing movement of the handles 4 and 5 accomplishes the function of breaking or tearing the shell apart by means of the prongs 13. To this end, a pair of rods 29 and 30 are pivoted to the free ends of the respective links 14 and 15 and movement of these rods outwardly causes the links to swing on their pivots or hinges 30', 31, carrying with them the opposing sections of the openable basket to position shown in Fig. 4. It will be seen clearly in Fig. 3 that the rods 29 30 pass through the tube 3 and are attached to a plate 32 which is perforated and slidable on the push bar 23. Between the slide plate 32 and a fixed plate 33 on the bar 23, a coiled spring 34 is held, and between the slide plate at its other side and the disk 35 which is fixed on the rear crossbar 21 of the yoke a second spring 36 of comparatively greater strength is held.

The operation of the device will be apparent. The egg is placed in the basket when the latter is in normal position, Fig. 5. The handles are now squeezed together or toward each other and the first movement of the parts projects the head 22 so that the egg is clamped between the head and the prongs 13 are caused to enter and pierce the egg shell. This movement is illustrated as accomplished in Fig. 3. Up to this time the weak spring 34 only has been compressed because the stronger spring has prevented movement of the slide plate 32. A continued movement of the handles however compresses the stronger spring 36, moves the slide 32 and with it the rods 29 and 30. The outward movement of these rods swings the links 14 and 15 outwardly and the sectional basket is opened. The fact that the prongs 1 are embedded in the shell causes them to rend and tear the shell apart as the basket sections separate and the broken shell is thus held in the basket while the egg itself is permitted to drop into the cup or receptacle 1 from which it may be poured as desired. When pressure is withdrawn from the handles the springs return the parts to normal position, and the broken egg shell may be disposed of as desired.

Having thus fully described our invention, what we claim is:—

1. The combination with a separable basket comprising pivoted arms formed with pronged holding members adapted to engage and enter an egg shell, of a clamping head and push bar, means for actuating the push bar to clamp the egg and additional means co-acting therewith for subsequently separating the pivoted arms for tearing apart the egg shell.

2. The combination with a receptacle of a separable basket comprising pivoted arms formed with pronged holding members, a clamping head and push bar, means for actuating the push bar to clamp an egg between said members and head and additional means co-acting therewith for subsequently separating the pivoted arms to cause the pronged members to rend the egg shell.

3. The combination with a separable basket adapted to break an egg, of a clamping head and push bar, a pair of pivoted handles to actuate said bar, and means operated from said bar to subsequently separate the basket.

4. The combination with a receptacle of a separable sectional basket having pronged members, a push bar and clamping head, a support attached to the receptacle, handles pivoted to the support, lever arms connecting the handles and push bar to move the push bar, and means adapted to receive delayed action from said bar to separate the basket sections.

In testimony whereof we affix our signatures in presence of two witnesses.

WILLIAM MEZEI.
FRANK PODMANICKY.

Witnesses:
 E. C. ALFORD,
 W. A. HIRTLE.

---

Copies of this patent may be obtained for five cents each, by addressing the "Commissioner of Patents, Washington, D. C."